Feb. 21, 1967 H. E. FRANKENBERG 3,305,143
CONTAINER FOR USE IN MANNED SPACE SHIPS
Filed Nov. 6, 1962 2 Sheets-Sheet 1

INVENTOR
HENRY E. FRANKENBERG

BY
Mason, Porter, Diller & Stewart
ATTORNEYS

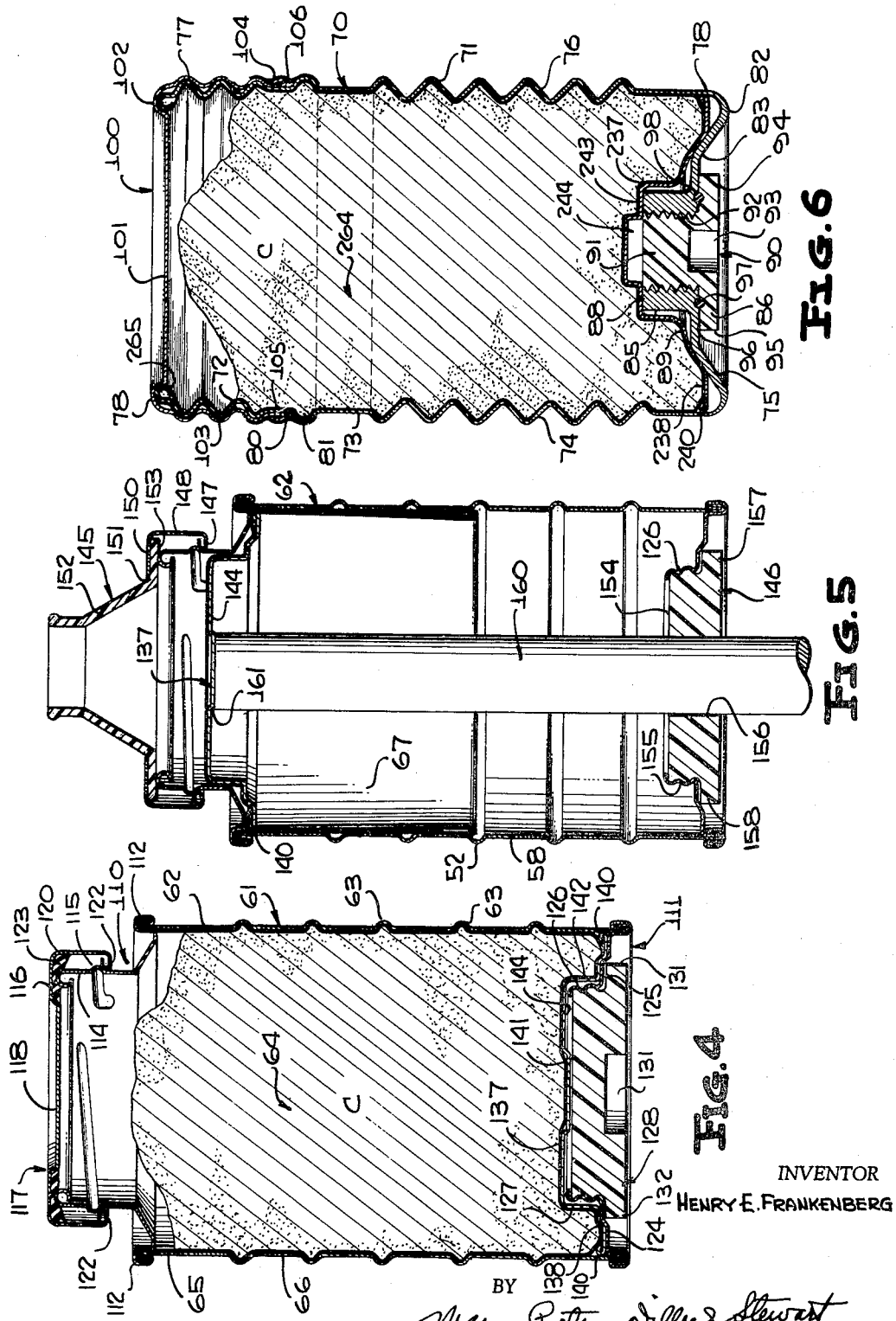

United States Patent Office 3,305,143
Patented Feb. 21, 1967

3,305,143
CONTAINER FOR USE IN MANNED
SPACE SHIPS
Henry E. Frankenberg, Berwyn, Ill., assignor to Continental Can Company, Inc., New York, N.Y., a corporation of New York
Filed Nov. 6, 1962, Ser. No. 235,796
24 Claims. (Cl. 222—386.5)

This invention relates to containers with contents-expelling means, particularly adapted for use in manned space ships, space-capsules or other spacecraft whether in suborbital, orbital, or interplanetary flight.

An object of this invention is the provision of a container having an openable and removable upper end contoured to the general configuration of an expelling plate reciprocably mounted internally of the container, whereby an optimum quantity of container contents can be expelled or dispensed through the openable end of the container.

Another object of the invention is the provision of a container having an internally reciprocal expelling plate and upper and lower ends closed by threaded closures, both threaded closures being removed when the container contents are to be expelled.

Another object of this invention is to provide a container of the type having an internally reciprocal expelling plate and upper and lower ends closed by threaded closures, and additionally, to provide an apertured guiding adaptor which replaces the lower threaded closure and guides a plunger for reciprocating the expelling plate when the container contents are to be expelled.

Still another object of the invention is to provide a container of the type having an expelling plate, upper and lower ends closed by threaded closures, and additionally, to provide the container with an internal liner which cooperates with the expelling plate for effectively expelling the container contents from the container.

Another object of the invention is to provide a container having at least one flat surface thereof available for contact with a thermostat of an associated heating device.

Another object of this invention is to provide a dispensing mouthpiece on one end of a container to facilitate expulsion of the contents of the container directly from the container to the mouth of a space traveler.

Still another object of this invention is the provision of a reinforced container by providing the body thereof with a plurality of longitudinally displaced reinforcing ribs or beads, and additionally, to provide the reinforced container with an internal liner conforming to the configuration of the beaded body and secured thereto by an openable and removable upper end or closure.

With the above, and other objects in view that will hereinafter appear, the nature of the invention will be more clearly understood by reference to the following detailed description, the appended claims and the several views illustrated in the accompanying drawings:

FIGURE 1 is an elevational view, with parts broken away and shown in section, of a container constructed in accordance with this invention, and shows a removable threaded closure secured to a lower end of the container, an expelling plate internally of the container and partially overlying the threaded closure, and an upper closure closing an openable upper end of the container.

FIGURE 2 is an elevational view, with parts broken away and shown in section, of the container shown in FIGURE 1, and illustrates an apertured guiding adaptor threaded into the lower end of the container, and a reciprocal expelling plate plunger guided by the adaptor in cooperation with the expelling plate during the dispensing of the container contents through an expelling nipple secured to the upper end of the container.

FIGURE 4 is a vertical sectioned view through a container which is similar to the container of FIGURE 1 but differs therefrom in that the container has a reinforced body and an internal liner is secured within the body in cooperation with an expelling plate.

FIGURE 5 is a vertical sectional view of the container illustrated in FIGURE 4, and shows an apertured guiding adaptor threaded into a lower end of the container, a dispensing mouthpiece on one end of the container, and the relationship of the expelling plate and the liner when the expelling plate plunger is fully inserted within the container body.

FIGURE 6 is a vertical sectional view through a modified container having an axially reinforced body, an inner liner, and a removable closure securing an upper portion of the liner to the container.

Contemporaneous with and after this country's successful orbital flights, the problem of effectively nourishing a space-voyager remains unsolved. Present-day containers have been proved to be inefficient under both actual and simulated space-flight conditions. The absence of gravity, with its inherent state of weightlessness, renders containers which were heretofore designed for use under atmospheric conditions incapable of being used in space. In addition, the present limitations in the size of spacecraft allow but a minimum amount of area for the storage of containers.

Figure 1:
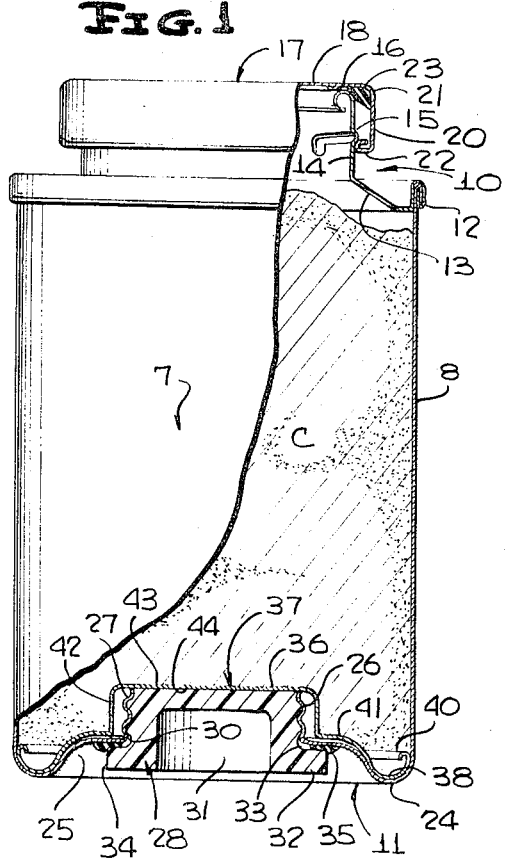
Figure 2:
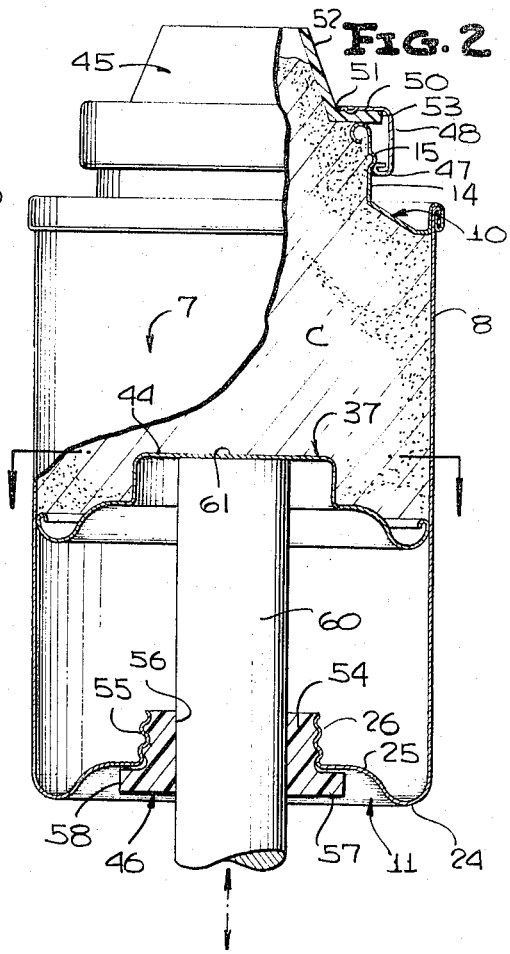

An inexpensive and efficient container contents dispensing container, constructed in accordance with the above-mentioned objects and limitations in mind, is illustrated in FIGURES 1 and 2 of the drawings.

A container 7 comprises a cylindrical tubular body 8 having an openable upper end 10 and an openable lower end 11. The container 7 is made of metal, and preferably of a lightweight metal such as aluminum. The upper end 10 of the container 7 is secured to the body 8 at an upper portion thereof by a double seam 12. An integral truncated radius 13 joins the seam 12 to an upstanding dispensing or expelling neck 14. The neck 14 is provided with a pair of diametrically opposed partial twist-type threads 15 (only one of which is shown) and terminates in an inwardly directed curl 16.

The upper end 10 of the container 7 includes an upper openable and removable closure 17 seated upon and secured to the neck 14. The openable closure 17 is a lug-type cap having an end wall 18 integrally joined to a depending peripheral skirt 20 by a shoulder 21. A pair of inwardly directed diametrically disposed lugs 22 (only one of which is shown) are integrally joined to the skirt 20. A suitable sealing compound 23 maintains an airtight connection between the container 7 and the closure 17.

The lower end 11 of the body 8 includes an annular shoulder 24 integrally joined to an inwardly directed circular recessed portion 25. The circular recessed portion 25 terminates radially inwardly in an upwardly directed neck portion 26 having threads 27.

A threaded closure plug 28 constructed of aluminum or similar lightweight material, is removably secured by means of threads 30 within the neck 26. To reduce the weight of the closure plug 28, the closure plug 28 is hollowed out to form a circular downwardly opening recess 31. The downwardly opening recess 31 may be non-circular i.e., square or hexagonal in transverse section, so that the recess may be used for the reception of a tool to facilitate removal of the closure plug 28. The closure plug 28 includes a radially outwardly directed peripheral flange 32 having an upper annular surface 33 and a peripheral surface 34. A suitable sealing compound 35, between the upper annular surface 33 and the recessed portion 25, creates an air-tight seal between the closure plug 28 and the interior of the body 8. The peripheral surface 34 of the flange 32 may be serrated to provide a gripping surface to facilitate removal of the closure plug 28. An upper circular surface 36 of the closure plug 28 provides a seat for an expelling plate 37.

Figure 3:
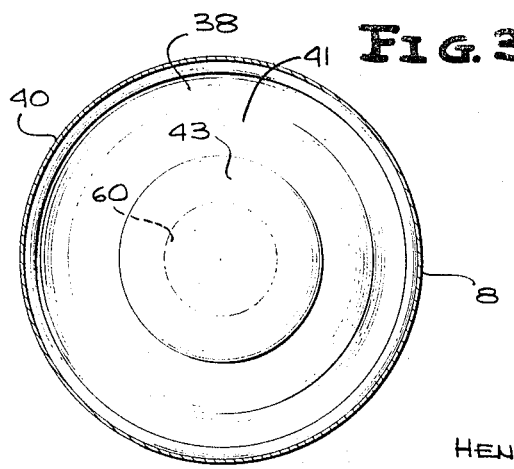
FIGURE 3 is a transverse sectional view taken along line 3—3 of FIGURE 2, and shows the upper configuration of the reciprocal expelling plate, and the guiding contact existing between the container body and a circumferential edge of the expelling plate.

The expelling plate 37 is of a circular configuration, as is best illustrated in FIGURE 3, and is reciprocably movable within the body 8 as shown in FIGURE 2. The expelling plate 37 is positioned at the lower end 11 of the body 8 prior to the expelling or dispensing of container contents C, as is best illustrated in FIGURE 1. The expelling plate 37 includes an annular channel 38 terminating in a downwardly directed half curl 40. The annular channel 38 is contoured to seat within the annular shoulder 24 of the body 8. The body 8 cooperates with the annular channel 38 to guide the expelling plate 37 as the same moves upwardly from the position shown in FIGURE 1. An annular shoulder 41 integrally joins the annular channel 38 to an upstanding expelling neck 42. As is best illustrated in FIGURE 1, the annular shoulder 41 conforms to the general configuration of the inwardly directed circular recessed portion 25. By thus contouring portions of the expelling plate 37 to the configuration of the lower end 11 of the body 8, an optimum amount of container contents C can be packaged in the container 7. The expelling neck 42 terminates in a circular expelling wall 43 having a lower plunger abutting surface 44. The expelling wall 43 and the annular shoulder 41 of the expelling plate 37 are contoured to the general configuration of the upper end 10 of the body 8, whereby a maximum quantity of the contents C may be expelled or dispensed from the body 8, as will hereinafter become apparent.

Before the contents C can be expelled from within the container 7 illustrated in FIGURE 1, the upper closure 17 and the lower closure plug 28 are removed. As is best illustrated in FIGURE 2, a dispensing or expelling nipple 45 is secured to the neck 14 of the body 8 upon the removal of the upper closure 17 shown in FIGURE 1. The lower closure plug 28 has been removed from the lower end 11 of the body 8, and an apertured guiding adaptor 46 is threadedly engaged within the lower neck 26.

The dispensing nipple 45 includes a pair of diametrically disposed inwardly directed lugs 47 (only one of which is shown) and an integral skirt 48. The lugs 47 cooperate with the threads 15 of the neck 14 in the manner heretofore mentioned in regard to the lugs 22 of FIGURE 1. An inwardly directed circumferential flange 50 is integrally joined to the skirt 48 and includes an opening 51. A pliable dispensing spout 52, constructed of polyethylene or similar plastic material, extends upwardly through the opening 51. The dispensing spout 52 includes an outwardly directed annular flange 53, underlying and secured to the flange 50 by an adhesive or by any other of a plurality of metal-to-plastic bonding methods well known in the art.

The apertured guiding adaptor 46 includes a body portion 54 provided with a threaded peripheral wall 55 and a circular guide aperture 56. The body portion 54 includes an outwardly radially directed annular flange 57, which may be knurled or otherwise formed along an external peripheral surface 58 thereof, to facilitate manual threading and unthreading of the guiding adaptor 46.

A plunger 60 is reciprocally guided by the aperture 56 in the guiding adaptor 46. The plunger 60 is reciprocated manually, or by an automatic mechanism forming no part of this invention. The plunger 60 has an upper circular surface 61 in abutment with the plunger abutting surface 44 of the expelling plate 37.

In order for a space voyager to receive nourishment from the container constructed in accordance with the embodiment of the invention illustrated in FIGURE 1, the container 7 shown therein need only be grasped by a person who manually removes the upper closure 17 and the lower closure plug 28. The dispensing nipple 45 is threadedly secured to the neck 14 of the body 8, and the apertured guiding adaptor 46 is threadedly secured within the lower neck 26 of the container end 11. The plunger 60 is then inserted within the guiding aperture 56 with the upper surface 61 thereof in abutment with the plunger abutting surface 44 of the expelling plate 37. The spout 45 is placed in a person's mouth and the plunger 60 is then manually moved upwardly (as is shown in FIGURE 2) and the contents C are expelled or dispensed through the spout 45. Because of the mating configuration of the expelling plate 37 and the upper end 10 of the body 8, an optimum quantity of contents C is dispensed from within the container 7.

When the container 7 has been emptied, the plunger 60, the dispensing nipple 45, and the apertured guiding adaptor 46 are removed. The upper closure 17 and the lower closure plug 28 are then secured to the respective necks 14 and 26. The empty container may then be stored in a suitable chamber within the spacecraft, and may be subsequently discarded.

A reinforced container 61, illustrated in FIGURES 4 and 5, is a modification of the container 7 shown in FIGURES 1 and 2. The container 61 comprises a body 62 having an upper end 110 and a lower end 111. The body 62 is reinforced by a plurality of axially spaced reinforcing beads 63.

The upper end 110 is secured to the body 62 by a double seam 112. An integral truncated radius 113 joins the seam 112 to an upstanding dispensing or expelling neck 114. The neck 114 is provided with a pair of diametrically opposed partial twist-type threads 115 and terminates in an inwardly directed curl 116. The upper end 110 of the container 61 includes an upper closure 117 seated upon and secured to the neck 114. The closure 117 is a lug-type cap, similar to the lug-type cap 17 shown in FIGURE 1, and includes a recessed end wall 118, a depending skirt 120 and a pair of inwardly directed diametrically opposed lugs 122. Sealing compound 123 maintains an air-tight connection between the container 61 and the upper closure 117.

The lower container end 111 includes an annular recessed portion 124 including an inwardly stepped flange 125. The inwardly stepped flange 125 is integrally connected to an inwardly threaded neck portion 126 having a plurality of threads 127 formed therein. A threaded closure plug 128, constructed of polyethylene or other such similar plastic material, is removably secured within the neck 126. To effect weight reduction, the closure plug 128 is hollowed out to form a circular downwardly opening recess 131, similar to the recess 31 in the closure plug 28 illustrated in FIGURE 1. The recess 131 may be non-circular for the reasons heretofore mentioned in connection with the recess 31 of the closure plug 28. The closure plug 128 includes a radially outwardly directed peripheral flange 132 having a peripheral surface 134 which may be knurled to facilitate threading and unthreading of the closure plug 128.

A generally circular expelling plate 137, similar to the expelling plate 37 shown in FIGURE 1, is located for reciprocal guiding movement within the body 62. The expelling plate 137 is normally positioned at the lower end 111 of the body 64 prior to the expelling of the container contents C, as is best illustrated in FIGURE 4. The expelling plate 137 includes an annular stepped flange 138 terminating in a curl 140. The annular stepped flange 138 is contoured to seat upon the annular recessed portion 124 of the end 111, as is best illustrated in FIGURE 4. By so contouring the annular stepped flange 138 of the expelling plate 137, a maximum quantity of contents C may be packaged within the body 62. The annular stepped flange 138 is joined to an upstanding expelling neck 142. The expelling neck 142 terminates in a circular top wall 143 having a recessed portion 141 and a lower plunger abutting surface 144. The expelling neck 142 and the expelling wall 143 are contoured to the configuration of the upper end 110 of the body 62, whereby a maximum quantity of the contents C may be expelled from the body 62.

A liner 64, constructed from flexible foil or plastic material, is secured within the interior of the container 61, and conforms to the general configuration of the body 62 and the expelling plate 137. The liner 64 includes an open upper end 65 secured to the body 62 by the seam 112, as is clearly shown in FIGURES 4 and 5. A peripheral wall 66 of the liner 64 conforms to the internal shape of the body 62 because of the pressure exerted by the contents C thereagainst, or alternatively, the liner 65 may be bonded to the body 62 as well as to the expelling plate 137. The liner 64 prevents the contents C from spoiling should a leak occur in the body 62, the end 110 or the end 111 and provides for optimum expulsion or dispensing of the contents C from within the container 61.

Before the contents C of the container 61 can be expelled from within the container, the upper closure 117 and the lower plug 128 must be removed in the manner set forth heretofore in the description of the FIGURE 1 embodiment of the invention. As is best illustrated in FIGURE 5, a dispensing or expelling nipple 145 and an apertured guiding adaptor 146 are secured to the body 62 in lieu of the respective upper closure 117 and the closure plug 128 illustrated in FIGURE 4.

The dispensing nipple 145 is substantially identical to the dispensing nipple 45 shown in FIGURE 2, and includes a pair of diametrically disposed inwardly directed lugs 147, a skirt 148, an inwardly directed annular flange 150, and an opening 151. A pliable dispensing spout 152, made of polyethylene or like plastic material, includes an outwardly directed annular flange 153, underlying and secured to the flange 150 by an adhesive.

The apertured guiding adaptor 146 includes a body 154 having a threaded peripheral wall 155 and a circular guide aperture 156. The body 154 includes an outwardly directed annular flange 157, which may be knurled or otherwise formed along an external peripheral surface 158 thereof, to facilitate manual threading and unthreading of the guide adaptor 146.

A plunger 160 is reciprocably guided in the aperture 156, in a manner heretofore set forth, and has an upper surafce 161 in abutment with the plunger abutting surface 144 of the expelling plate 137.

The method of using the container disclosed in FIGURES 4 and 5 to dispense the contents C therefrom is identical to the way the container 7, shown in FIGURES 1 and 2 is used. However, it should be noted that as the plunger 160 is moved upwardly in the container 61, the peripheral wall 66 of the liner 64 is "peeled-off" the interior of the body 62, in a manner clearly illustrated in FIGURE 5. Also, the peripheral curl 140 is spaced from the body 62 to allow a peeled-off portion 67 to depend below the expelling plate 137. This above-mentioned spacing between the peripheral curl 140 and the body 62 prevents the liner 64 from bunching up atop the expelling plate 137 as the same is reciprocated within the body 62. It should also be noted that the neck 126 of the container 61 has a larger diameter than the neck 26 of the container 7. The larger diameter of the neck 126 allows the expelling plate 137 to be reciprocated within the body 62 without using the apertured guiding adaptor 146 or the plunger 160. That is, the diameter of the neck 126 is sufficiently large to allow the fingers of a person using the container 61 to be inserted within the body 62 through the neck 126 to move the expelling plate 137.

A modified container constructed in accordance with this invention is illustrated in FIGURE 6, and is generally designated by the reference numeral 70. The container 70 includes a body 71 having an upper portion 72, an intermediate portion 73 and a lower portion 74 terminating in an integral thickened container end 75. The body 71 is reinforced by a plurality of annular beads 76 formed in the lower portion 74 and a plurality of annular beads 77 formed in the upper portion 72. The annular reinforcing beads 77 are more closely spaced than the annular reinforcing beads 76 for a purpose to be hereinafter disclosed. The upper portion 72 of the body 71 terminates in an inwardly directed curl 78.

The upper portion 72 includes an annular channel 80 and an enlarged bead 81, each performing a function to be hereinafter described.

The intermediate portion 73 of the body 71 is adapted to secure the container 70 in an ejecting device, forming no part of this invention.

The lower end 75 of the container 70 includes an annular shoulder 82 and an inwardly directed thickened circular recessed portion 83. The recessed portion 83 includes an annular flange 84 terminating in an upwardly directed neck 85. A bottom surface 86 of the flange 84 is provided with an annular seal-receiving groove 87. The neck 85 is threaded at 88.

A threaded closure plug 90 includes a body 91 having threads 92 securing the closure plug 90 within the neck 85. The body 91 includes a downwardly opening recess 93 similar in structure and function to the recesses 31 and 131. The body 91 includes a radially outwardly directed peripheral flange 94 having a knurled surface 95, to facilitate removal of the closure plug 90 from the neck 85. An upper surface 96 of the peripheral flange 94 has an annular seal-receiving recess 97. The annular recesses or grooves 87 and 97 house a seal or gasket 98, thereby assuring an air-tight connection between the the closure plug 90 and the interior of the container 70. An expelling plate 237, substantially identical to the expelling plates 37 and 137, is similarly located for reciprocal guiding movement within the body 71 and seats upon the lower end 75 thereof. The expelling plate 237 includes an annular stepped flange 238 terminating in a peripheral curl 240. An upstanding expelling neck 242 is integrally joined to the flange 238 and terminates in a top expelling wall 243 having a circular recessed central portion 244. The recessed portion 244 of the expelling plate 237 cooperates with a plunger, similar to the plunger 160 shown in FIGURE 5.

A liner 264, substantially identical to the liner 64 of FIGURE 4, is secured within the body 71. The liner 264 includes an upper portion 265 overlying the curl 78 and depending downwardly along the outer surface of the upper portion 72 of the body 71.

A roll-on-type cap 100 overlies the liner portion 265 and seats upon the curl 78. The cap 100 includes an inwardly recessed end wall 101, an integral bead 102 and an annular bead skirt 103 terminating in an upwardly directed curl 104 having a container shoulder abutting surface 105. As is clearly illustrated in FIGURE 6, the liner 264 is clampingly secured to the container 70 by the clamping action created by the beaded skirt 103 and the complementary beads 77 of the upper container portion 72. Thus, the beads 77 perform the dual function of reinforcing the upper portion 72 of the body 71, and in addition, cooperate with the beaded skirt 103 to clamp the liner 264 within the container 70. An annular piece of tape 106 such as pressure-sensitive tape, overlies the curl 104 and the enlarged bead 81 to preclude inadvertent removal of the cap 100 from the upper portion 72 of the body 71.

To use the container 70, a suitable nipple (such as the dispensing nipple 145 shown in FIGURE 5 with the engaging lugs 147 modified to accommodate the beads 77) is substituted for the cap 100. The closure plug 90 is removed and replaced by an apertured guiding adaptor (not shown) similar to the apertured guiding adaptor 146 illustrated in FIGURE 5. The contents of the container 70 may then be expelled or dispensed in the manner described in connection with FIGURES 2 and 5.

It should be noted that the end walls 18, 118, and 101 of the respective closures or caps 17, 117 and 100 include substantial flat areas adapted for contact with a thermostatic heating device (not shown), whereby the contents of the respective containers may be heated prior to being dispensed from within the containers.

While the nature or ingredients of the container-contents C has not been heretofore disclosed, it is within the scope of this invention to dispense both liquid, semi-solid and paste-type contents from a container constructed in accordance with the foregoing disclosure. The container illustrated in FIGURES 1 and 2 is particularly adapted for dispensing both a paste-type and a semi-solid type medium, while the containers illustrated in FIGURES 4 through 6 are more suited for dispensing liquid contents.

The contents C may be either a food or a non-food product. For example, not only food products, but non-food products such as semi-solid, paste-type or liquid vitamins or distilled water may comprise the contents C. Coffee and other stimulants may likewise form the contents C of any of the disclosed containers for subsequent dispensing or expelling therefrom.

While example disclosures of containers with expelling or dispensing means for use in manned spacecraft are shown and disclosed herein, it is to be understood that changes in the disclosed containers and their components may be made without departing from the spirit and scope of the invention as defined in the appended claims.

I claim:

1. A container for use in manned spacecraft comprising a body including an upper openable end and a lower openable end, an imperforate one-piece closure at each of said upper and lower openable ends, said closures having axes in parallel alignment with the body axis, first securing means removably securing said closures to said ends, a reciprocal expelling plate in said body adjacent said lower openable end and adapted for movement toward said upper openable end, an apertured adaptor, second securing means removably securing said apertured adaptor to said lower openable end upon the removal of said closure from said lower openable end, said first and second securing means including common complementary portions, said apertured adaptor including an axial aperture for permitting access into said body, and a plunger for introduction into said body through said axial aperture whereby the expelling plate may be moved toward said upper openable end to dispense contents therefrom when the upper openable end is opened.

2. The container as defined in claim 1 wherein said expelling plate is contoured to the general configuration of the upper and lower openable ends of said body whereby an optimum quantity of contents may be packaged within the container and an optimum quantity of the packaged contents can be dispensed therefrom.

3. The container as defined in claim 1 wherein the common complementary portions of said first and second means are complementary threaded portions of said lower openable end, the lower imperforate closure and the apertured adaptor.

4. The container as defined in claim 3 wherein said reciprocal expelling plate includes a peripheral edge contoured to the internal configuration of the body whereby said expelling plate is reciprocally guided within the body.

5. The container as defined in claim 4 wherein said expelling plate has a bottom plunger abutting surface adapted for engagement by a reciprocal plunger whereby movement is imparted to the expelling plate to dispense contents within the body through the upper openable end.

6. A container for use in manned spacecraft comprising a body including an upper openable end and a lower openable end, an imperforate closure at each of said upper and lower openable ends, first securing means removably securing said closures to said ends, a reciprocal expelling plate in said body adjacent said lower openable end and adapted for movement toward said upper openable end, an apertured adaptor, second securing means removably securing said apertured adaptor to said lower openable end upon the removal of said closure from said lower openable end, said first and second securing means including common complementary portions, said apertured adaptor permitting access into said body whereby the expelling plate may be moved toward said upper openable end to dispense contents therefrom when the upper openable end is opened, the common complementary portions of said first and second means being complementary threaded portions of said lower openable end, the lower imperforate closure and the apertured adaptor, said expelling plate including a peripheral edge contoured to the internal configuration of the body whereby said expelling plate is reciprocally guided within the body, said expelling plate having a bottom plunger abutting surface adapted for engagement by a reciprocal plunger whereby movement is imparted to the expelling plate to dispense contents within the body through the upper openable end, and the lower openable end of said body including a recessed portion and said expelling plate including a portion depending from said neck thereof and contoured to the configuration of said recessed portion.

7. The container as defined in claim 1 wherein said lower closure, said apertured guiding adaptor and a portion of said lower openable end are complementary threaded.

8. The container as defined in claim 4 wherein said peripheral edge includes a curl portion and said expelling plate has a top wall of an area substantially equal to the transverse cross-sectional area of an opening defined by said openable upper end.

9. A container for use in manned spacecraft comprising a body including an upper openable end and a lower openable end, an imperforate closure at each of said upper and lower openable ends, first securing means removably securing said closures to said ends, a reciprocal expelling plate in said body adjacent said lower openable end and adapted for movement toward said upper openable end, an apertured adaptor, second securing means removably securing said apertured adaptor to said lower openable end upon the removal of said closure from said lower openable end, said first and second securing means including common complementary portions, said apertured adaptor permitting access into said body, and a liner having an open upper end secured to the openable upper end of the body and a lower end overlying said expelling plate whereby the expelling plate and liner may be moved toward said upper openable end to dispense contents from within the liner when the upper openable end is opened.

10. The container as defined in claim 9 wherein the open upper end of the liner is clampingly secured to the openable upper end of the body and includes a liner body bonded to the body of the container and the expelling plate whereby movement of said expelling plate toward said openable upper end causes a bonded portion of said liner to peel-off the body of said container.

11. The container as defined in claim 10 wherein the expelling plate includes a peripheral portion spaced from the interior of said container body.

12. The container as defined in claim 11 wherein the peripheral portion includes a peripheral edge having means to prevent rupture of the liner as the expelling plate is moved toward the upper openable end of the body.

13. The container as defined in claim 12 wherein the body is axially reinforced by a plurality of beads.

14. The container as defined in claim 13 wherein said expelling plate has a bottom plunger abutting surface adapted for engagement by a reciprocal plunger whereby movement is imparted to the expelling plate to dispense contents within the body through the upper openable end.

15. The container as defined in claim 13 wherein the lower openable end of said body includes a recessed portion, and said expelling plate includes a portion depending from said neck thereof and contoured to the configuration of said recessed portion.

16. The container as defined in claim 13 wherein said expelling plate is contoured to the general configuration of the upper and lower openable ends of said body whereby an optimum quantity of contents may be packaged within the container and an optimum quantity of the packaged contents can be dispensed therefrom.

17. A container for use in manned spacecraft comprising a body including an upper openable end and a lower openable end, an imperforate closure removably secured to each of said upper and lower openable ends, a reciprocal expelling plate in said body adjacent said lower openable end and adapted for movement toward said upper openable end, said expelling plate being contoured to the configuration of the upper and lower openable ends of said body whereby an optimum quantity of contents may be packaged within the container and an optimum quantity of the packaged contents can be dispensed therefrom, said upper openable end, said expelling plate and said lower openable end each including a complementary cooperative neck, the lower openable end of said body including a recessed portion, and said expelling plate including a portion depending from said neck thereof and contoured to the configuration of said recessed portion.

18. A container as defined in claim 17 including an apertured guiding adaptor, said lower closure, said apertured guiding adaptor and the neck of said expelling plate are complementary threaded.

19. A container for use in manned spacecraft comprising a body including an upper openable end and a lower openable end, an imperforate closure at each of said upper and lower openable ends, first securing means removably securing said closures to said ends, a reciprocal expelling plate in said body adjacent said lower openable end and adapted for movement toward said upper openable end, an apertured adaptor, second securing means removably securing said apertured adaptor to said lower openable end upon the removal of said closure from said lower openable end, said first and second securing means including common complementary portions, said apertured adaptor permitting access into said body, and a liner having an open upper end secured to the openable upper end of the body and a lower end overlying said expelling plate whereby the expelling plate and liner may be moved toward said upper openable end to dispense contents from within the liner when the upper openable end is opened, and wherein the upper removable closure includes a portion clampingly securing the open end of the liner to the openable upper end of said body.

20. A container as defined in claim 19 wherein said body includes reinforcing means and said removable closure portion includes means cooperable with said reinforcing means to simultaneously secure the upper removable closure and said liner to said body.

21. A container as defined in claim 20 wherein said reinforcing means and said means cooperable therewith comprise a plurality of complementary beads.

22. A container as defined in claim 21 wherein said liner includes a liner body bonded to the body of the container.

23. A container for use in manned spacecraft comprising a body including an upper openable end and a lower openable end, an imperforate closure at each of said upper and lower openable ends, first securing means removably securing said closure to said ends, a reciprocate expelling plate in said body adjacent said lower openable end and adapted for movement toward said upper openable end, an apertured adaptor, second securing means removably securing said apertured adaptor to said lower openable end upon the removal of said closure from said lower openable end upon the removal of said closure from said lower openable end, said first and second securing means including common complementary portions for alternately securing said lower closure and said apertured adaptor to said lower openable end, said common complementary portions of said first and second means being complementary threaded portions of said lower openable end, the lower imperforate closure and the apertured adaptor, and a liner in said body having a lower end overlying said expelling plate whereby the expelling plate and liner may be moved toward said upper openable end to dispense contents from within the liner when the upper openable end is opened.

24. The container as defined in claim 23 wherein said reciprocal expelling plate includes means for preventing rupture of said liner during the movement of said expelling plate toward said upper openable end.

References Cited by the Examiner
UNITED STATES PATENTS

| | | | |
|---|---|---|---|
| 580,052 | 4/1897 | Lindemeyer | 222—95 |
| 1,222,185 | 4/1917 | Copeman | 222—386.5 X |
| 1,235,550 | 8/1917 | Carmody | 222—386.5 |
| 1,265,533 | 5/1918 | Searle | 222—386 |
| 1,474,118 | 11/1923 | Rice | 222—386 |
| 1,741,326 | 12/1929 | McNally | 222—386 |
| 1,964,623 | 6/1934 | Durand. | |
| 2,145,613 | 1/1939 | Shenk et al. | 222—386.5 |
| 2,587,683 | 3/1952 | Barry | 222—327 X |
| 2,743,044 | 4/1956 | Deemer et al. | 222—323 |
| 2,954,144 | 9/1960 | Elam et al. | 222—386 X |

FOREIGN PATENTS 451,583   8/1936   Great Britain.

ROBERT B. REEVES, *Primary Examiner.*

EUGENE V. BLANCHARD, LOUIS J. DEMBO,
*Examiners.*

S. H. TOLLBERG, *Assistant Examiner.*